United States Patent
Soldan et al.

(10) Patent No.: US 9,668,419 B2
(45) Date of Patent: Jun. 6, 2017

(54) AUTOMATIC LOAD CONTROL FOR SELF-PROPELLED WINDROWER

(71) Applicant: AGCO Corporation, Hesston, KS (US)

(72) Inventors: Daniel Soldan, Hillsboro, KS (US); Brendon C. Nafziger, Canton, KS (US); Shane Bollinger, Hesston, KS (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 15/113,598

(22) PCT Filed: Jan. 30, 2015

(86) PCT No.: PCT/US2015/013671
§ 371 (c)(1),
(2) Date: Jul. 22, 2016

(87) PCT Pub. No.: WO2015/116892
PCT Pub. Date: Aug. 6, 2015

(65) Prior Publication Data
US 2017/0000030 A1   Jan. 5, 2017

Related U.S. Application Data

(60) Provisional application No. 61/933,908, filed on Jan. 31, 2014.

(51) Int. Cl.
*A01D 41/127* (2006.01)
*A01D 69/03* (2006.01)
(Continued)

(52) U.S. Cl.
CPC ........... *A01D 69/03* (2013.01); *A01D 41/127* (2013.01); *A01D 41/1274* (2013.01);
(Continued)

(58) Field of Classification Search
CPC combination set(s) only.
See application file for complete search history.

(56) References Cited

U.S. PATENT DOCUMENTS 3,093,946 A * 6/1963 Pitt .................... A01D 41/1274
460/6
4,376,298 A * 3/1983 Sokol .................. A01D 41/127
340/462

(Continued)

OTHER PUBLICATIONS

European Patent Office, International Search Report for Parent International Patent Application No. PCT/US2015/013671, mailed May 13, 2015.

(Continued)

*Primary Examiner* — Alicia Torres (57) ABSTRACT

A windrower has a hydrostatic header drive system with a header drive pump and one or more header drive motors. The windrower also has a chassis with wheels coupled thereto, an engine, and a ground drive system coupled to the wheels and the engine. A control system has plural sensors having first, second, and third sensors, wherein the first sensor monitors engine load, the second sensor monitors hydrostatic header drive pressure, and the third sensor monitors ground speed. The control system has one or more controllers configured to receive input from the plural sensors, compare the input with respective target values for engine load, header drive pressure, and ground speed throughout a range of ground speeds defined based on an operator configured maximum ground speed, and automatically adjust the ground speed based on the comparison.

15 Claims, 6 Drawing Sheets

(51) Int. Cl.
*A01D 41/14* (2006.01)
*A01D 57/12* (2006.01)
*F02D 41/00* (2006.01)
*F02D 41/02* (2006.01)
*F02D 41/10* (2006.01)
*F02D 41/26* (2006.01)

(52) U.S. Cl.
CPC ........... *A01D 41/142* (2013.01); *A01D 57/12* (2013.01); *F02D 41/0097* (2013.01); *F02D 41/0215* (2013.01); *F02D 41/10* (2013.01); *F02D 41/26* (2013.01); *F02D 2200/10* (2013.01); *F02D 2200/501* (2013.01)

(56) References Cited

U.S. PATENT DOCUMENTS

| | | |
|---|---|---|
| 6,036,597 A | 3/2000 | Arner |
| 7,748,202 B2 | 7/2010 | Chervenka et al. |
| 2008/0034720 A1 | 2/2008 | Helfrich et al. |
| 2009/0018730 A1* | 1/2009 | Tarasinski ............ A01D 41/127 701/50 |
| 2009/0149296 A1* | 6/2009 | Eastman ............... B60W 10/06 477/115 |
| 2010/0307219 A1 | 12/2010 | Fackler et al. |
| 2014/0069072 A1* | 3/2014 | Gamble ............... A01D 34/006 56/10.2 A |

OTHER PUBLICATIONS

AGCO Corporation, WR9870 and WR9860 New Product Introduction Information provided to Equipment Brand Dealers Nov 1, 2013.

* cited by examiner

AUTOMATIC LOAD CONTROL FOR SELF-PROPELLED WINDROWER

CROSS REFERENCE TO RELATED APPLICATION

This application claims the benefit of U.S. Provisional Application No. 61/933,908, filed Jan. 31, 2014, which is hereby incorporated by reference in its entirety.

BACKGROUND OF THE INVENTION

Field of Invention

This invention relates to agricultural machines and, more particularly, self-propelled rotary windrowers.

Description of Related Art

Self-propelled windrowers equipped with rotary headers can typically operate at high speeds, limited primarily by the load on the engine and the pressure of the hydrostatic header drive system. To achieve maximum productivity, the operator must continuously vary the ground speed manually as operating conditions (e.g., crop conditions, ground conditions, including topology, etc.) vary throughout a given field. The constant attention and actions by the operator in operating the windrower are stressful and fatiguing.

Overview of the Invention

In one embodiment, the invention is directed to a windrower having a hydrostatic header drive system with a header drive pump and one or more header drive motors. The windrower also has a chassis with wheels coupled thereto, an engine, and a ground drive system coupled to the wheels and the engine. A control system has plural sensors having first, second, and third sensors, wherein the first sensor monitors engine load, the second sensor monitors hydrostatic header drive pressure, and the third sensor monitors ground speed. The control system has one or more controllers configured to receive input from the plural sensors, compare the input with respective target values for engine load, header drive pressure, and ground speed throughout a range of ground speeds defined based on an operator configured maximum ground speed, and automatically adjust the ground speed based on the comparison.

In another embodiment, the invention is directed to a method implemented in a machine, including receiving in real time input corresponding to a plurality of parameters, the parameters including engine load, hydraulic pressure of a working implement of the machine, and ground speed; concurrently monitoring the plurality of parameters throughout a range of ground speeds, the range determined based on an operator configured maximum ground speed; and automatically adjusting the ground speed based on a comparison of the plurality of parameters with respective targeted values.

These and other features and advantages of this invention are described in, or are apparent from, the following detailed description of various exemplary embodiments of the systems and methods according to this invention.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Certain embodiments of an automatic load control system and method are disclosed that monitor a plurality of parameters such as engine load, hydraulic pressure (e.g., hydrostatic header drive pressure), and ground speed, and automatically adjust the ground speed to keep either or both of engine load and hydrostatic header drive pressure (hereinafter, also referred to as header drive pressure, hydraulic pressure, header pressure, and the like) from exceeding acceptable limits. In one embodiment, the automatic load control system comprises a controller (or in some embodiments, plural controllers) that receives real time input from a plurality of sensors that monitor the parameters, and compares the same with respective target values. The controller adjusts the ground speed to keep the windrower working at its maximum capacity.

By contrast, in conventional windrowers, ground speed adjustment is a purely manual process that requires the operator to pay attention to the engine load (e.g., via monitoring engine speed) and header drive pressure and adjust the machine ground speed himself. Certain embodiments of an automatic load control system, through its continual and concurrent monitoring and automated ground speed adjustment, reduces operator workload and increases productivity.

Having summarized certain features of an automatic load control system of the present disclosure, reference will now be made in detail to the description of the disclosure as illustrated in the drawings. While the disclosure will be described in connection with these drawings, there is no intent to limit it to the embodiment or embodiments disclosed herein. For instance, though emphasis is placed on a machine in the agricultural industry, and in particular, a self-propelled windrower with a rotary header drive system, certain embodiments of an automatic load control system may be beneficially deployed in other machines (in the same or other industries) where monitoring of engine load and hydraulic functions and adjustment of ground speed to operate at or near maximum capacity with respect to engine load and hydraulic pressure is desired. For instance, combine harvesters that utilize hydraulic rotor mechanisms may similarly benefit from certain embodiments of an automatic load control system. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Note that references hereinafter made to certain directions, such as, for example, "front", "rear", "left" and "right", are made as viewed from the rear of the windrower looking forwardly.

Figure 1:
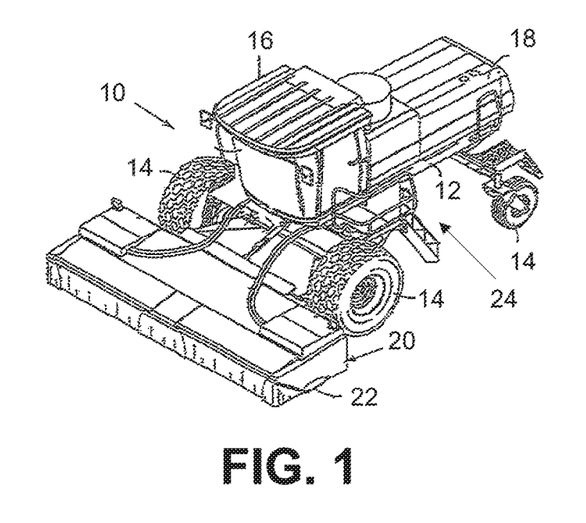
FIG. 1 is a schematic diagram that illustrates, in front perspective view, an example machine in which an embodiment of an automatic load control system may be implemented.

Reference is made to FIG. 1, which illustrates an example agricultural machine where an embodiment of an automatic load control system may be implemented. One having ordinary skill in the art should appreciate in the context of the present disclosure that the example agricultural machine, depicted in FIG. 1 as a self-propelled windrower 10, is merely illustrative, and that other machines and/or components with like functionality may deploy certain embodiments of an automatic load control system in some embodiments. The self-propelled windrower 10 is operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 (although tracks may be used in some embodiments, or other configurations in the number and/or arrangement of wheels may be used in some embodiments) for movement across a field to be harvested. The chassis 12 carries a cab 16, within which an operator may control certain operations of the windrower 10, and a rearwardly spaced compartment 18 housing a power source (not shown) such as an internal combustion engine. The chassis 12 also supports a ground drive system that, in one embodiment, when powered by the engine, causes differential rotation of the wheels (e.g., increasing the speed of one wheel while decreasing the speed of the opposite wheel) according to a dual path steering mechanism as is known in the art.

A coupled working implement, depicted in FIG. 1 as a harvesting header 20, is supported on the front of the chassis 12 in a manner understood by those skilled in the art. The header 20 may be configured as a modular unit and consequently may be disconnected for removal from the chassis 12. As is also known in the art, the header 20 has a laterally extending crop cutting assembly 22 in the form of a low profile, rotary style cutter bed located adjacent the front of the header 20 for severing crop from the ground as the windrower 10 moves across a field. However, one skilled in the art will understand that other types of crop cutting assemblies 22, such as sickle style cutter beds, may also be used in some embodiments.

The windrower 10 also includes an automatic load control system 24, which may in one embodiment include one or more controllers, machine controls (e.g., a ground drive system, a hydrostatic header drive system), and a plurality of sensors that monitor, in real time, a plurality of parameters (e.g., engine load, such as determined via engine RPM, hydrostatic header drive pressure, ground speed, etc.), as further described below. The automatic load control system 24 enables adjustments in ground speed based on the sensed parameters.

During a harvesting operation, the windrower 10 moves forward through the field with the header 20 lowered to a working height. Some crop conditions (e.g., dense, tough, and/or moist crop, etc.) may, depending on the ground speed, impose excessive loads (or in some instances, lighter loads) on the hydrostatic header drive system, and some ground conditions (e.g., moist ground, soft ground, etc.), including topology (e.g., steep hills), may impose excessive loads (or lighter loads in some instances) on the engine (and ground drive system). In other words, changes in crop and/or ground conditions may be encountered by the windrower 10 during operations, which are addressed by certain embodiments of an automatic load control system 24 without operator intervention.

Figure 2:
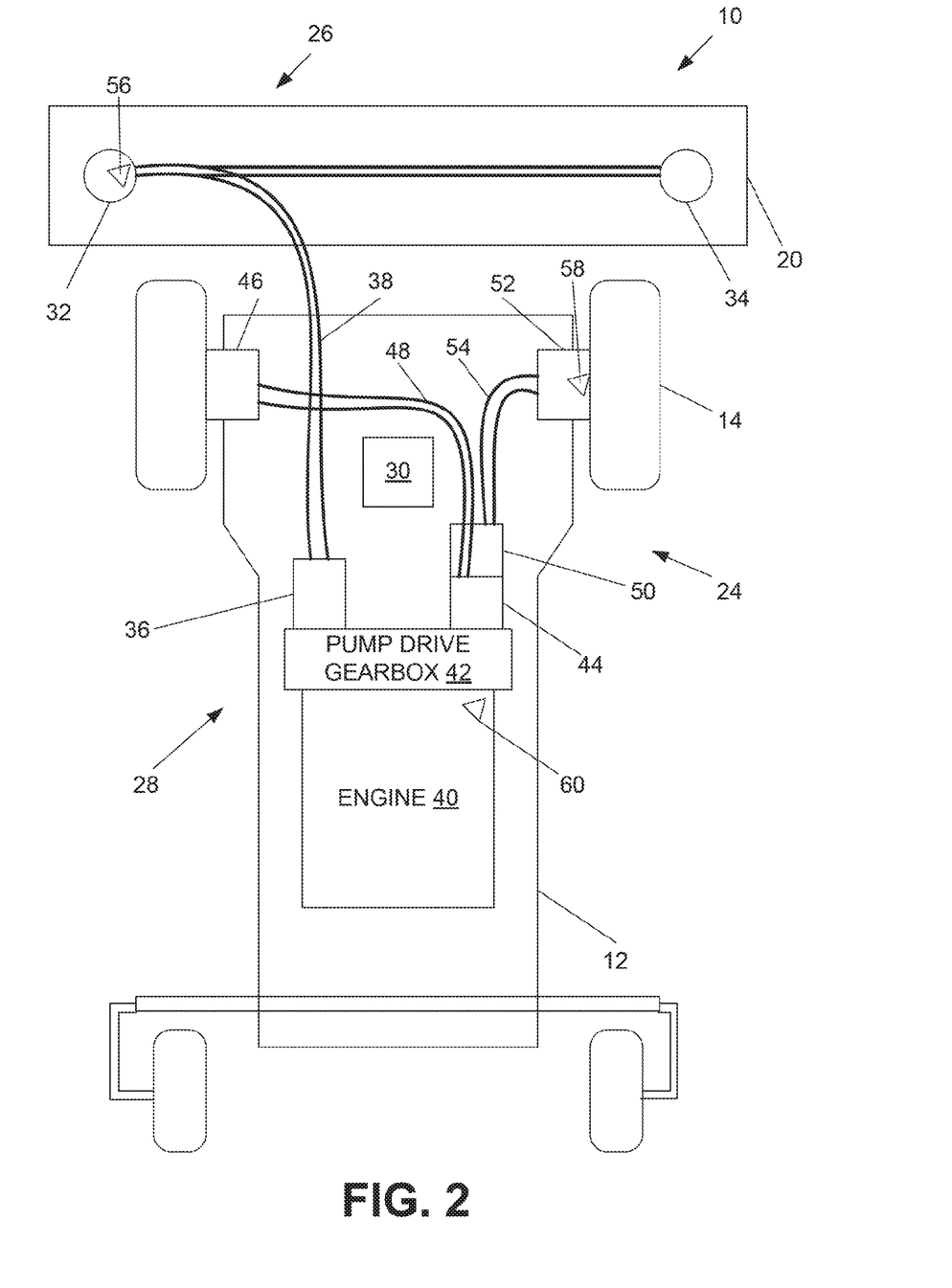
FIG. 2 is a schematic diagram that illustrates, in top fragmentary plan view, an embodiment of an example automatic load control system cooperating with an example hydrostatic header drive system, engine, and ground drive system of the example windrower of FIG. 1.

Referring now to FIG. 2, shown in fragmentary, overhead plan view is the example windrower 10 of FIG. 1. It should be appreciated, within the context of the present disclosure, that the example construction of the windrower 10 depicted in FIG. 2 is merely illustrative of a type of environment in which an embodiment of an automatic load control system may be implemented, and that other designs or machines may likewise provide a suitable environment with beneficial effect. As shown (with certain well-known features omitted for brevity and clarity), the windrower 10 is depicted with the header 20 and the chassis 12, which is coupled to the header 20 and to the wheels 14. In one embodiment, the automatic load control system 24 comprises a hydrostatic header drive system 26, a ground drive system 28, and one or more controllers, such as controller 30 (as described further below). In some embodiments, the automatic load control system 24 may comprise additional, fewer, and/or different subsystems. The hydrostatic header drive system 26 comprises header drive motors 32 and 34 (though some embodiments may have fewer or additional motors) and a header drive pump 36 that is fluidly coupled to the header drive motors 32 and 34 via hydraulic fluid lines, such as hydraulic fluid line 38, as is known. The ground drive system 28 is powered by an engine 40 mounted to the chassis 12, and comprises a pump drive gearbox 42 coupled to the engine 40. The ground drive system 28 further comprises a left wheel propel pump 44 coupled to the pump drive gearbox 42, and further coupled to a left wheel drive motor 46 via hydraulic fluid lines, such as hydraulic fluid line 48. The ground drive system 28 also comprises a right wheel propel pump 50 coupled to the pump drive gearbox 42, and further coupled to a right wheel drive motor 52 via hydraulic fluid lines, such as hydraulic fluid line 54. Although depicted as comprising a by-wire system, other hydraulic mechanisms may be used to facilitate ground transportation in some embodiments, and hence are contemplated to be within the scope of the disclosure.

In operation, software in the controller 30 provides for control of the ground drive system 28. Sensors are located on or proximal to the steering wheel and the forward-neutral-reverse (FNR) lever in the cab 16 (FIG. 1), where operator manipulation of the steering wheel and/or FNR lever causes movement of the same that is sensed by the sensors. These sensors feed signals to the controller 30, which in turn provide control signals to the propel pumps 44 and 50 to achieve the requested speed and direction of the windrower 10. The signaling from the controller 30 causes a change in fluid displacement in the respective propel pumps 44 and 50, each displacement in turn driving the respective wheel drive motors 46 and 52 via hydraulic fluid lines 48 and 54.

In one embodiment, the automatic load control system 24 further comprises a plurality of sensors (symbolically represented by triangles in FIG. 2), such as sensors 56 (to monitor hydrostatic header drive pressure), 58 (to monitor ground speed), and 60 (to monitor engine load, such as via engine RPM). Though depicted in specific areas of placement, it should be appreciated that some embodiments may position the sensors 56-60 in other locations and/or place sensors in additional locations, and in some embodiments, a different quantity (e.g., more or less) of sensors may be used. The sensors 56-60 may communicate information pertaining to the sensed parameter to the controller 30 over a wired or wireless medium (or combination thereof). The sensors 56-60 may be embodied as non-contact (e.g., imaging, Doppler, acoustic, terrestrial or satellite based, among other wavelengths, inertial sensors, etc.) and/or contact-type sensors (e.g., pressure transducers, speed sensors, Hall effect, position sensors, strain gauge, etc.). In some embodiments, monitored data may be communicated over a bus directly from the monitored device or components. For instance, electronics associated with the engine 40 may communicate absolute data (e.g., engine RPM) or relative data (e.g., percent increase or decrease) in RPM or other parameter(s) associated with load over a communications bus to the controller 30.

In operation, the sensor 56 detects the hydrostatic header drive pressure at one or both of the header drive motors 32 and 34, though in some embodiments, detection may be elsewhere within the hydrostatic header drive system 26. Increases in the hydrostatic header drive pressure may be due to increased cutting load, for instance. The sensor 58 detects ground speed, which in this example, is based on monitoring wheel rotation, but in some embodiments, may be achieved via Doppler radar or other mechanisms well-known in the art. The sensor 60 detects engine load, which in one embodiment may be achieved via contact or non-contact detection of engine RPMs.

Explaining further the operation of an embodiment of the automatic load control system 24, the automatic load control system 24 uses engine load (e.g., as determined by engine speed or RPMs), hydrostatic header drive pressure, and an operator selected ground speed as inputs. For the engine speed and the hydrostatic header drive pressure, there are defined targets that the automatic load control system 24 uses to determine if the ground speed should be reduced from what the operator has selected with the ground speed lever (e.g., FNR lever). For instance, in one embodiment, the targets may be 2,100 RPM for the engine speed and 4000 PSI for the hydrostatic header drive pressure. If the engine speed drops below 2,100 RPM, or if the hydrostatic header drive pressure rises above 4,000 PSI, the automatic load control system 24 begins to reduce the ground speed at a rate that is proportional to the offset to the target. For example, if the engine speed is 2,030 RPM, the rate of ground speed reduction (e.g., deceleration) is less than if the engine speed had fallen to 2,000 RPM. Likewise, if the hydrostatic header drive pressure is 4,500 PSI, the rate of deceleration is greater than it would be if the pressure is only 4,100 RPM. The automatic load control system 24 monitors both the hydrostatic header drive pressure and engine speed concurrently, with the adjusted windrower ground speed determined by the most heavily loaded system.

Digressing briefly, with reference to the engine load, engine speed is an indicator of load because the engine 40 is commanded to maintain a constant speed. For example, the engine's ratings may be 230 horsepower (HP) at 2,000 RPM and 220 HP at 2,100 RPM, and the engine speed may be commanded to be 2,100 RPM. Below 2,000 RPM, the engine's power rating drops off, which may cause the engine 40 to bog down if the load is too severe. As the load on the engine 40 increases, the engine 40 maintains 2,100 RPM until the load exceeds 220 HP, for instance. As the load exceeds 220 HP, the engine 40 begins to slow down, exhibiting a behavior that enables the engine speed to be used as an indicator of engine load; in particular, the higher the engine speed, the lesser the load, and the lower the engine speed, the higher the load. One goal of the automatic load control system 24 is to keep the engine 40 between 2,000 RPM and 2,100 RPM, for example, since this is the region where the engine produces the most power. In addition, by decreasing the ground speed, the power requirements of the ground drive system 28 are reduced, as well as the power requirements from the hydrostatic header drive system 26, which reduces the load on the engine 40. Note that the use above of specific values for RPM and horsepower are merely illustrative, and that other values may be used depending on, for instance, the design of the machine.

In one embodiment, the automatic load control system 24 operates according to a defined minimum ground speed that the automatic load control system 24 is capable of reducing the windrower ground speed to, such as a percentage of the operator requested ground speed (though some embodiments may omit this feature, or provide other mechanisms for the minimum ground speed). For instance, the automatic load control system 24 may determine a minimum ground speed by applying, for instance, 65% to the operator configured ground speed. Using an illustrative example, if the operator requests a ground speed of 14 MPH, the slowest speed that the automatic load control system 24 applies is approximately 9 MPH (0.65×14, rounded down in this example). In this example, the automatic load control system 24 enables a range of ground speed from a bordered minimum of 9 MPH to a bordered maximum of 14 MPH. By applying this limit (e.g., targeted ground speed minimum), the automatic load control system 24 prevents the requested and actual ground speed from becoming too far apart, which may be disconcerting to the operator if allowed to exceed the limits. In other words, in one embodiment, at no time does the automatic load control system 24 permit the windrower ground speed to exceed the operator configured ground speed (maximum), even if the engine speed and/or header pressure fall below their maximums. This limiting feature of certain embodiments enables the operator to select a maximum ground speed suitable for other factors such as field roughness (e.g., terrain or ground conditions) and cutoff quality.

Figure 3:
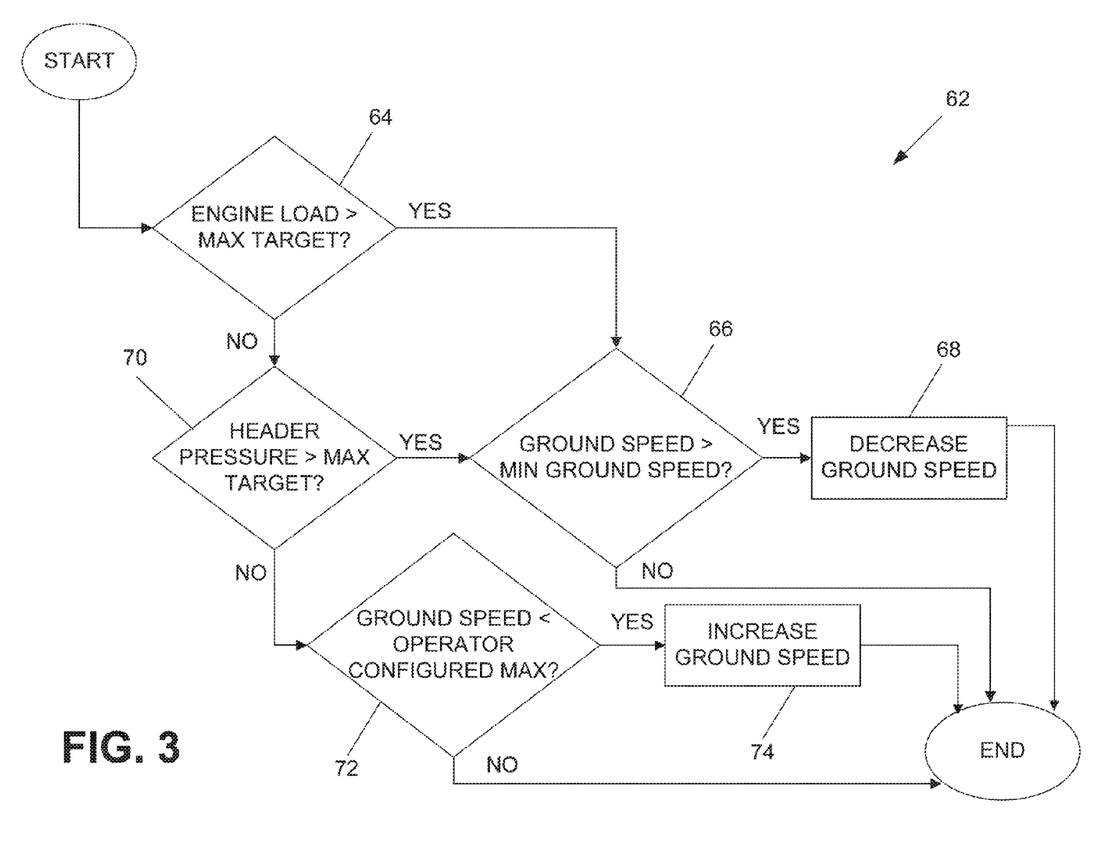
FIG. 3 is a flow diagram that illustrates an embodiment of an example automatic load control method.

Attention is now directed to FIG. 3 (with continued reference to FIG. 2), which is a flow diagram that illustrates one embodiment of an automatic load control method 62. It should be appreciated that the method 62 illustrated in FIG. 3 is merely illustrative, and that in some embodiments, other and/or a different quantity of steps may be implemented. Though shown in FIG. 3 with explicit start and end points, the method 62 is, in practice, implemented in a continuous loop. Further, though shown in a given sequence, some embodiments may alter the sequence or perform two or more steps in the method 62 concurrently, as described further below. After the start, one embodiment of the method 62 comprises determining whether the engine load is greater than a maximum target (64). For instance, using the example explained below, engine horsepower may have risen from 220 HP (at 2,100 RPM) to some value greater than 220 HP (e.g., 230 HP at 2,000 RPM). The rise in horsepower (load) corresponds to a decline in engine RPM (e.g., from 2,100 to 2,000), the decline in RPM indicating that the engine load (horsepower) has increased. In other words, in one embodiment, the engine target load is in terms of a defined value for horsepower, and the target horsepower value may lie between a rated engine horsepower and a peak engine horsepower (e.g., so it is not the absolute maximum horsepower the engine can produce, but slightly below that value). In some embodiments, other measures and/or ranges for the target horsepower may be used, with the engine RPMs serving as the monitored indication of the changes in load as explained above. If the engine load exceeds the maximum target load ("Yes"), the method 62 determines whether the ground speed is greater than a targeted ground speed value (e.g., minimum ground speed) (66). As noted above, the minimum ground speed value, or targeted value, may be determined by the automatic load control system 24 by applying a defined percentage to the operator configured maximum ground speed. If the ground speed is greater than the minimum ground speed ("Yes"), the method 62 decreases the ground speed (68), or equivalently, decelerates the windrower 10 (FIG. 1). If the ground speed determination in (66) results in a determination that the ground speed is not greater than the minimum ground speed ("No"), no change in ground speed is implemented ("End").

Returning to (64), if the engine load is not greater than the maximum target ("No"), the method 62 determines whether the header pressure is greater than a maximum target (70). If the header pressure is greater than the maximum target ("Yes"), then the process continues to (66) followed by either (68) or "End," in the manner as described above. From (70), if the header pressure is not greater than the maximum target from ("No"), the method 62 determines if the ground speed is less than the operator configured maximum (72). If so ("Yes"), the method 62 increases the ground speed (accelerates the windrower 10, FIG. 1) in (74), otherwise ("No") the method 62 does not adjust the ground speed ("End").

In some embodiments, the method 62 may implement (64) and (70) independently and concurrently, and base the adjustment on minimizing the parameter value variance from the targeted value that imposes the greatest load. For instance, if the engine load determination of (64) requires a deceleration of 1.0 ft/sec$^2$, and the header pressure determination (70) requires a deceleration of 1.5 ft/sec$^2$, the latter suggesting a greater offset required to the load, the method 62 implements the deceleration of 1.5 ft/sec$^2$. As another example, if the engine load determination (64) requires a deceleration, and the header pressure determination (70) requires acceleration of the windrower 10, the deceleration requirement suggests an offset to a greater load, and hence the deceleration is selected by the method 62. It is also noted that the method 62 is performed throughout the range of ground speeds defined by the operator configured maximum and the determined minimum.

Figure 4A:
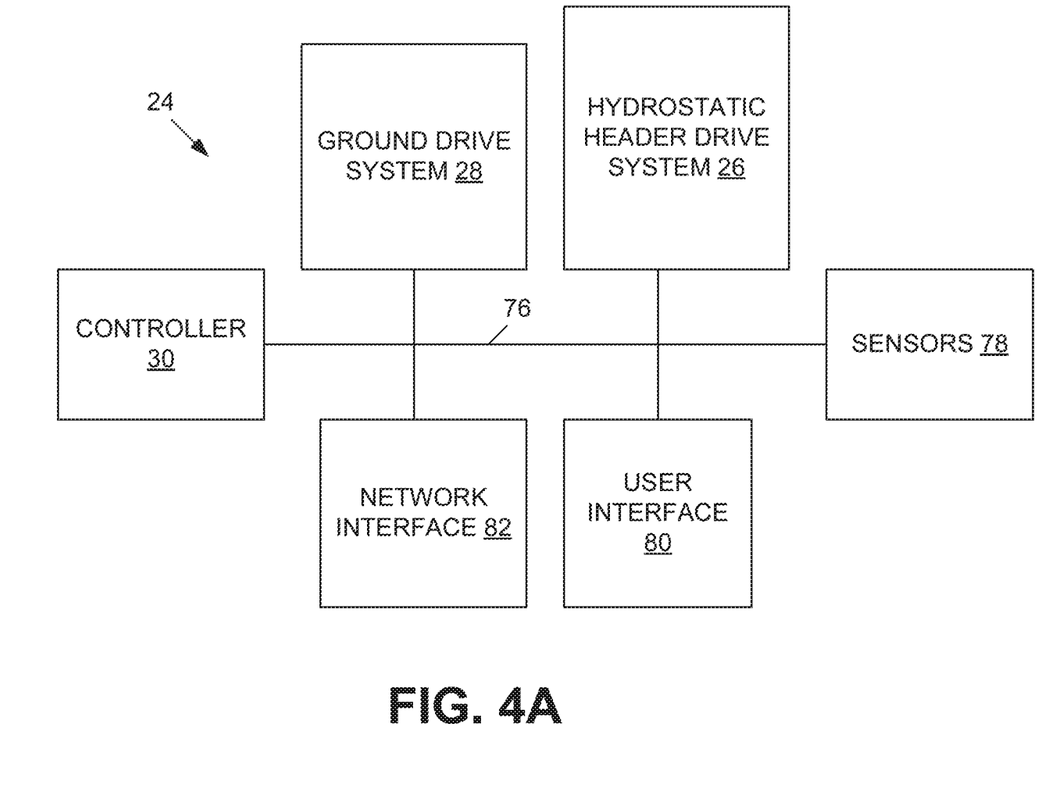
FIG. 4A is a block diagram of an embodiment of an example automatic load control system.

Having described some example operations of an automatic load control system 24, attention is directed to FIG. 4A, which illustrates an embodiment of an automatic load control system 24. It should be appreciated within the context of the present disclosure that some embodiments may include additional components or fewer or different components, and that the example depicted in FIG. 4A is merely illustrative of one embodiment among others. Further, in some embodiments, the automatic load control system 24 may be distributed among plural machines. For instance, sensing functionality may reside locally with the windrower 10 (FIG. 1) whereas the control of ground speed is administered remotely (e.g., via a remote control server). The automatic load control system 24 comprises one or more controllers, such as the controller 30. The controller 30 is coupled via one or more networks, such as network 76 (e.g., a CAN network or other network, such as a network in conformance to the ISO 11783 standard, also referred to as "Isobus"), to the ground drive system 28, the hydrostatic header drive system 26, plural sensors 78 (which may include sensors 56-60, as well as other sensors of the windrower 10), a user interface 80, and a network interface 82. Note that control system operations are primarily disclosed herein in the context of control via a single controller 30, with the understanding that additional controllers may be involved in one or more of the disclosed functionality in some embodiments.

With continued reference to FIG. 2, the ground drive system 28 includes the various components to enable the windrower 10 to traverse a field, such as the propel pumps 44 and 50, the wheel drive motors 46 and 52, and the hydraulic fluid lines 48 and 54. The hydrostatic header drive system 26 comprises the various components that enable the header 20 to operate, and include the header drive motors 32 and 34, the header drive pump 36, and the hydraulic fluid lines 38. The sensors 78 include the position sensors of the FNR lever and steering wheel, as well as the sensors 56, 58, and 60 that monitor in real time the hydraulic pressure, ground speed, and engine speed, respectively. The sensors 78 may be embodied as contact (e.g., electromechanical sensors, such as position sensors, safety switches, etc.) and non-contact type sensors (e.g., photo-electric, inductive, capacitive, ultrasonic, etc.), all of which comprise known technology. In some embodiments, the sensors may include a global navigation satellite system (GNSS) receiver and/or other position indication components (e.g., terrestrial-based) that enable determination of position and/or ground speed, as well as inertial sensors. The user interface 80 may include one or more of a keyboard, mouse, microphone, touch-type display device, joystick, steering wheel, FNR lever, or other devices (e.g., switches, immersive head set, etc.) that enable input and/or output by an operator (e.g., to respond to indications presented on the screen or aurally presented) and/or enable monitoring of machine operations. The network interface 82 comprises hardware and/or software that enable wireless connection to one or more remotely located computing devices over a network (e.g., a wireless or mixed wireless and wired network). For instance, the network interface 82 may cooperate with browser software or other software of the controller 30 to communicate with a server device over cellular links, among other telephony communication mechanisms and radio frequency communications, enabling remote monitoring or control of the windrower 10. The network interface 82 may comprise MAC and PHY components (e.g., radio circuitry, including transceivers, antennas, etc.), as should be appreciated by one having ordinary skill in the art.

In one embodiment, the controller 30 is configured to receive and process information from the sensors 78, and communicate with the ground drive system 28 to cause an acceleration or deceleration of the windrower 10 (FIG. 1) based on the input of information from the sensors 78. In some embodiments, the controller 30 may receive input from the user interface 80, as entered by the operator. For instance, the operator may prompt a display of the parameters (e.g., engine RPM, hydraulic pressure, ground speed), where the controller 30 provides the corresponding information for rendering on a display screen in the cab 16 (FIG. 1) or remotely, or otherwise provided to an operator in other forms (e.g., audibly). In some embodiments, the controller 30 may provide feedback of any automatic adjustment in ground speed to the operator via the user interface 80. Note that even though the description herein describes engine speed to determine the load of the engine 40 (FIG. 2), other methods may be used to determine engine load over the network 76 as previously described.

Figure 4B:
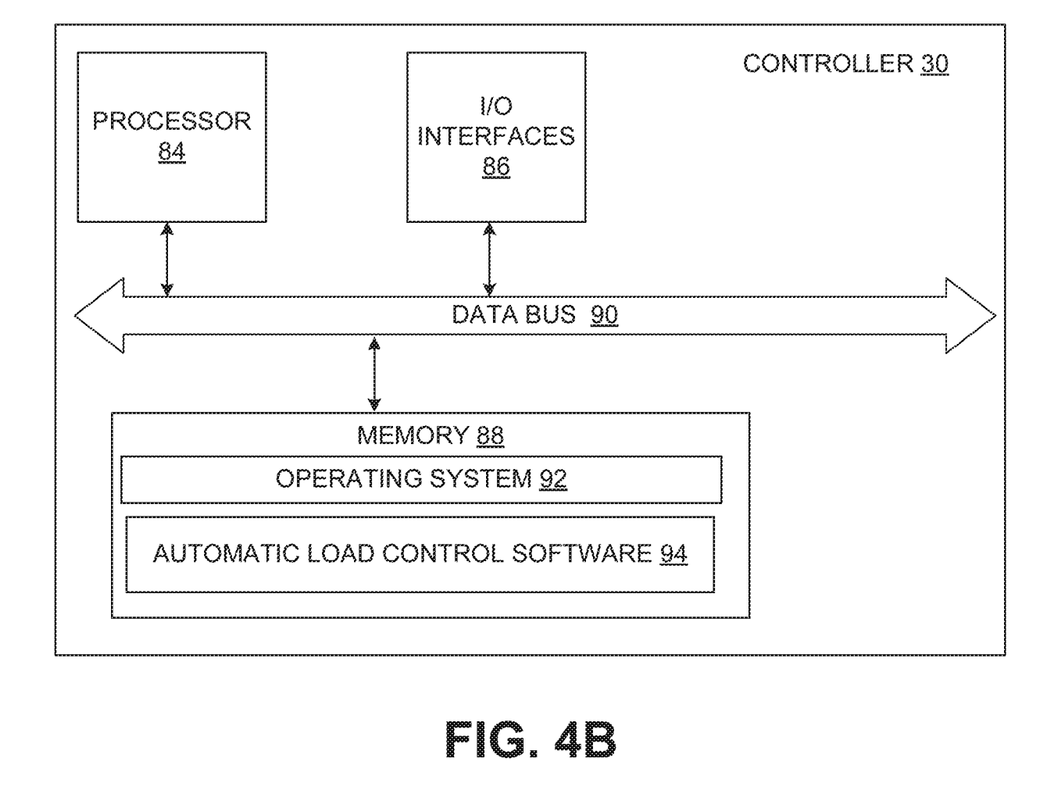
FIG. 4B is a block diagram of an embodiment of an example controller used in an embodiment of an automatic load control system.

FIG. 4B further illustrates an example embodiment of the controller 30. One having ordinary skill in the art should appreciate in the context of the present disclosure that the example controller 30 is merely illustrative, and that some embodiments of controllers may comprise fewer or additional components, and/or some of the functionality associated with the various components depicted in FIG. 4B may be combined, or further distributed among additional modules, in some embodiments. It should be appreciated that, though described in the context of residing in the windrower 10 (FIG. 1), in some embodiments, the controller 30, or all or a portion of its corresponding functionality, may be implemented in a computing device or system located external to the windrower 10. Referring to FIG. 4B, with continued reference to FIG. 4A, the controller 30 is depicted in this example as a computer system, but may be embodied as a programmable logic controller (PLC), field programmable gate array (FPGA), application specific integrated circuit (ASIC), among other devices. It should be appreciated that certain well-known components of computer systems are omitted here to avoid obfuscating relevant features of the controller 30. In one embodiment, the controller 30 comprises one or more processors (also referred to herein as processor units or processing units), such as processor 84, input/output (I/O) interface(s) 86, and memory 88, all coupled to one or more data busses, such as data bus 90. The memory 88 may include any one or a combination of volatile memory elements (e.g., random-access memory RAM, such as DRAM, and SRAM, etc.) and nonvolatile memory elements (e.g., ROM, hard drive, tape, CDROM, etc.). The memory 88 may store a native operating system, one or more native applications, emulation systems, or emulated applications for any of a variety of operating systems and/or emulated hardware platforms, emulated operating systems, etc.

In the embodiment depicted in FIG. 4B, the memory 88 comprises an operating system 92 and automatic load control software 94. It should be appreciated that in some embodiments, additional or fewer software modules (e.g., combined functionality) may be deployed in the memory 88 or additional memory. In some embodiments, a separate storage device may be coupled to the data bus 90, such as a persistent memory (e.g., optical, magnetic, and/or semiconductor memory and associated drives).

The automatic load control software 94 receives input corresponding to one or more parameters, such as ground speed, hydrostatic header drive pressure, and engine load. For instance, the parameters may be associated with input received via the I/O interfaces 86 (e.g., from the sensors 78, FIG. 4A). The automatic load control software 94 compares these sensed parameters to targeted values stored in memory 88, and signals to the ground drive system 28 the adjustment in ground speed (e.g., acceleration or deceleration) based on the comparison. For instance, the automatic load control software 94 may implement the method 62 (FIG. 3) and associated processes described in conjunction with FIG. 3 to achieve a ground speed that ensures that the windrower 10 (FIG. 1) is operating at maximum or near maximum capacity. The operator configured maximum ground speed may be stored in memory 88, as received via the I/O interfaces 86 from the user interface 80 (FIG. 4A), or received remotely via the network interface 82. The automatic load control software 94 also calculates the minimum ground speed, such as via application of a defined percentage (e.g., as programmed into the software by the manufacturer or by other personnel) and/or via a look-up table, which results in an operating range of ground speeds based on the operator-inputted maximum ground speed.

Execution of the automatic load control software 94 may be implemented by the processor 84 under the management and/or control of the operating system 92. In some embodiments, the operating system 92 may be omitted and a more rudimentary manner of control implemented. The processor 84 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 30.

The I/O interfaces 86 provide one or more interfaces to the network 76 and other networks. In other words, the I/O interfaces 86 may comprise any number of interfaces for the input and output of signals (e.g., analog or digital data) for conveyance of information (e.g., data) over the network 76. The input may comprise input by an operator (local or remote) through the user interface 80 and input from signals carrying information from one or more of the components of the automatic load control system 24, such as the sensors 78 and/or the network interface 82, among other devices.

When certain embodiments of the controller 30 are implemented at least in part with software (including firmware), as depicted in FIG. 4B, it should be noted that the software can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program (e.g., executable code or instructions) for use by or in connection with a computer-related system or method. The software may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

When certain embodiment of the controller 30 are implemented at least in part with hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
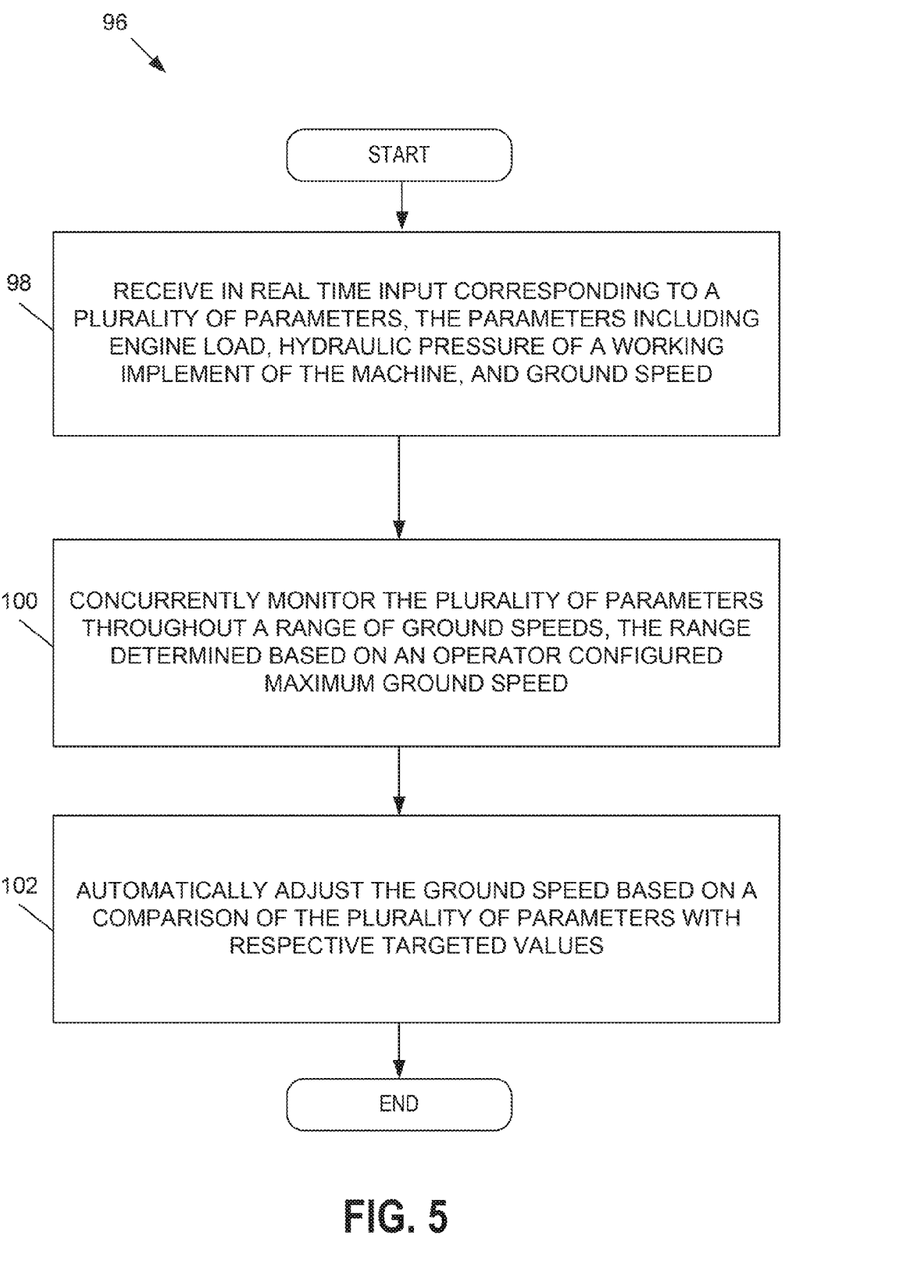
FIG. 5 is a flow diagram that illustrates an embodiment of an example automatic load control method.

In view of the above description, it should be appreciated that one embodiment of an automatic load control method 96, depicted in FIG. 5 (and implemented in one embodiment by the automatic load control software 94, FIG. 4B), comprises receiving in real time input corresponding to a plurality of parameters, the parameters including engine load, hydraulic pressure of a working implement of the machine, and ground speed (98); concurrently monitoring the plurality of parameters throughout a range of ground speeds, the range determined based on an operator configured maximum ground speed (100); and automatically adjusting the ground speed based on a comparison of the plurality of parameters with respective targeted values (102).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein. Although the control systems and methods have been described with reference to the example embodiments illustrated in the attached drawing figures, it is noted that equivalents may be employed and substitutions made herein without departing from the scope of the disclosure as protected by the following claims.

At least the following is claimed:

1. A windrower, comprising:
  a hydrostatic header drive system comprising a header drive pump and one or more header drive motors;
  a chassis with wheels coupled thereto;
  an engine;
  a ground drive system coupled to the wheels and the engine; and
  a control system, comprising:
    plural sensors comprising first, second, and third sensors, wherein the first sensor monitors engine load, the second sensor monitors hydrostatic header drive pressure, and the third sensor monitors ground speed;
    one or more controllers configured to:
      receive input from the plural sensors, wherein the input corresponds to the engine load and the ground speed;
      compare the input with respective target values for engine load, header drive pressure, and ground speed throughout a range of ground speeds defined based on an operator configured maximum ground speed; and
      automatically adjust the ground speed based on the comparison by reducing the ground speed if the engine load is greater than the target value for the engine load and the ground speed is greater than the target value for the ground speed, wherein the target value for the ground speed comprises a minimum ground speed, and wherein the one or more controllers are configured to automatically set the minimum ground speed based on applying a defined percentage to the operator configured maximum ground speed.

2. The windrower of claim 1, wherein the one or more controllers are configured to determine that the engine load is greater than the target value for the engine load based on monitoring of engine RPM.

3. The windrower of claim 1, wherein the input further corresponds to the header drive pressure, wherein the one or more controllers are configured to adjust by reducing the ground speed if the header drive pressure is greater than the target value for the header drive pressure and the ground speed is greater than the target value for the ground speed.

4. A windrower, comprising:
  a hydrostatic header drive system comprising a header drive pump and one or more header drive motors;
  a chassis with wheels coupled thereto;
  an engine;
  a ground drive system coupled to the wheels and the engine; and
  a control system, comprising:
    plural sensors comprising first, second, and third sensors, wherein the first sensor monitors engine load, the second sensor monitors hydrostatic header drive pressure, and the third sensor monitors ground speed;
    one or more controllers configured to:
      receive input from the plural sensors, wherein the input corresponds to the header drive pressure and the ground speed;
      compare the input with respective target values for engine load, header drive pressure, and ground speed throughout a range of ground speeds defined based on an operator configured maximum ground speed; and
      automatically adjust the ground speed based on the comparison by reducing the ground speed if the header drive pressure is greater than the target value for the header drive pressure and the ground speed is greater than the target value for the ground speed, wherein the target value for the ground speed comprises a minimum ground speed, wherein the one or more controllers are configured to automatically set the minimum ground speed based on applying a defined percentage to the operator configured maximum ground speed.

5. The windrower of claim 3, wherein the one or more controllers are configured to adjust by increasing the ground speed if the engine load is less than the target value for the engine load, the header drive pressure is less than the target value for the header drive pressure, and the ground speed is less than the operator configured maximum ground speed.

6. The windrower of claim 5, wherein the one or more controllers are configured to adjust the ground speed by adjusting acceleration or deceleration of the windrower.

7. The windrower of claim 3, wherein the one or more controllers are configured to adjust the ground speed based on the inputs corresponding to the header drive pressure and the engine load by minimizing a larger load as determined by a difference between engine RPM and the header drive pressure and their respective target values.

8. The windrower of claim 5, wherein the windrower either reduces in the ground speed or increases in the ground speed based on the adjustment.

9. The windrower of claim 1, further comprising a user interface coupled to the one or more controllers, the user interface providing feedback to an operator of the adjustment.

10. A method implemented in a machine, comprising:
receiving in real time input corresponding to a plurality of parameters, the parameters including engine load, hydraulic pressure of a working implement of the machine, and ground speed;
concurrently monitoring the plurality of parameters throughout a range of ground speeds, the range determined based on an operator configured maximum ground speed; and
automatically adjusting the ground speed based on a comparison of the plurality of parameters with respective targeted values by reducing the ground speed if the engine load is greater than the target value for the engine load or if the header drive pressure is greater than the target value for the header drive pressure and the ground speed is greater than the target value for the ground speed, wherein the target value for the ground speed comprises a minimum ground speed, and wherein the one or more controllers are configured to automatically set the minimum ground speed based on applying a defined percentage to the operator configured maximum ground speed.

11. The method of claim 10, wherein automatically adjusting comprises minimizing variation from the targeted values.

12. The windrower of claim 4, wherein the one or more controllers are configured to adjust by increasing the ground speed if the engine load is less than the target value for the engine load, and the ground speed is less than the operator configured maximum ground speed.

13. The windrower of claim 12, wherein the windrower either reduces in the ground speed or increases in the ground speed based on the adjustment.

14. The windrower of claim 12, wherein the one or more controllers are configured to adjust the ground speed by adjusting acceleration or deceleration of the windrower.

15. The windrower of claim 4, wherein the one or more controllers are configured to determine that the engine load is greater than the target value for the engine load based on monitoring of engine RPM.

* * * * *